United States Patent [19]
Welter

[11] Patent Number: 5,175,935
[45] Date of Patent: Jan. 5, 1993

[54] SCREW-THREAD GAUGE-WIRE HOLDER

[76] Inventor: Daniel Welter, 1028 Via Bregani, San Lorenzo, Calif. 94580

[21] Appl. No.: 846,260

[22] Filed: Feb. 28, 1992

[51] Int. Cl.5 .............................................. G01B 5/16
[52] U.S. Cl. ..................................... 33/199 R; 33/829
[58] Field of Search ............................ 33/829, 199 R

[56] References Cited

U.S. PATENT DOCUMENTS 2,692,438 10/1954 Schneider ........................ 33/199 X
2,939,220 6/1960 Crushier et al. ...................... 33/829

Primary Examiner—Harry N. Haroian

[57] ABSTRACT

I have invented a new and novel "holder" to hold individual threadwire gauges used to measure the thread pitch of screws and bolts. The holder takes full advantage of the properties of new materials used in the holder, including magnets, rubber and synthetic plastics. The holder will accomodate and hold in place without the use of hands on the threadwires, the wiresets used to measure the thread pitch using the three wire method and a micrometer.

2 Claims, 1 Drawing Sheet

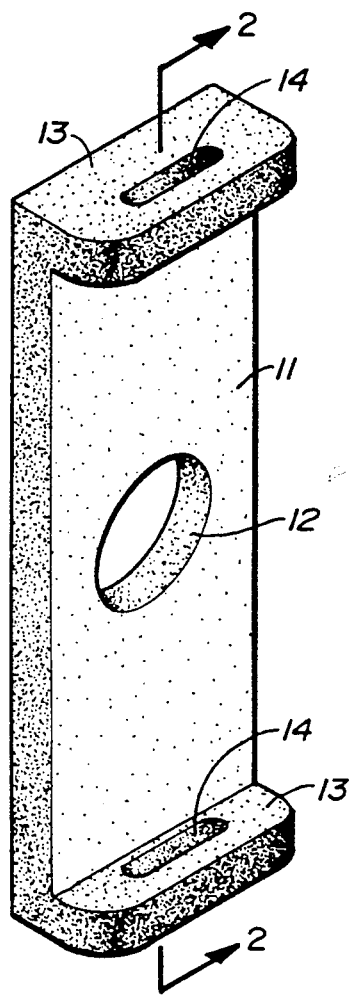
FIG._1
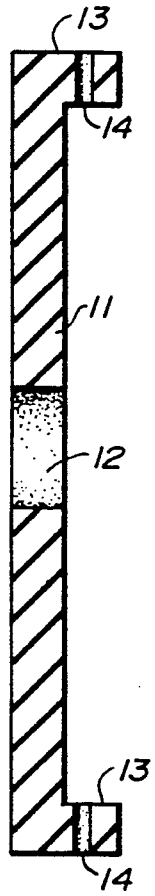
FIG._2
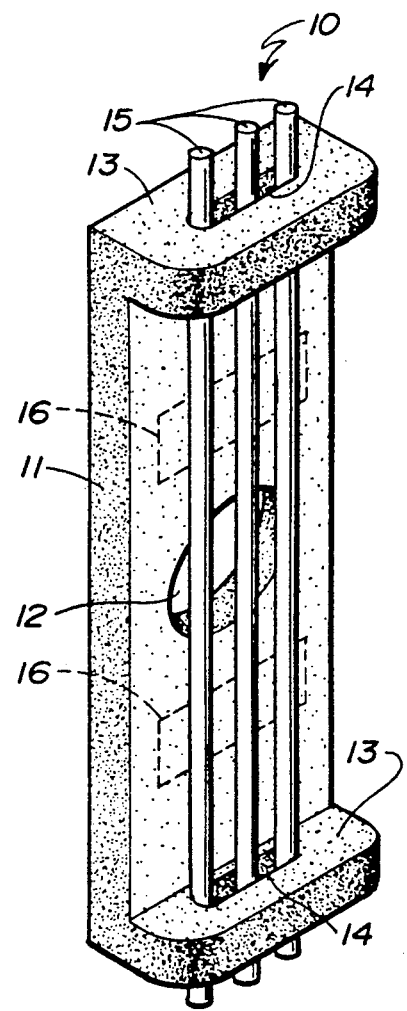
FIG._3
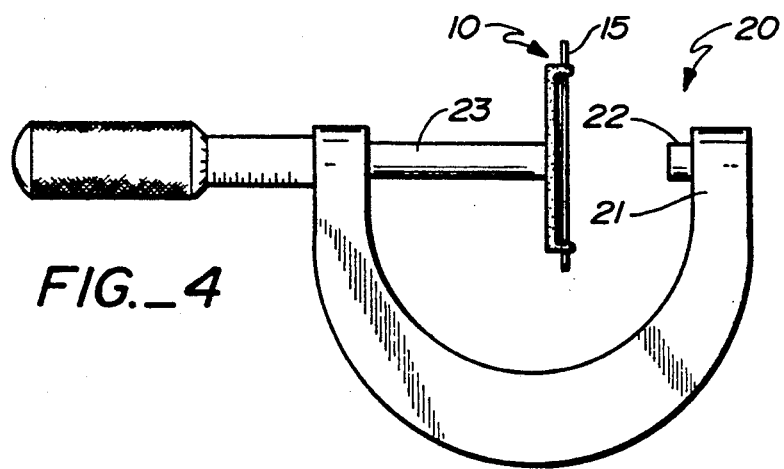
FIG._4

SCREW-THREAD GAUGE-WIRE HOLDER

The invention described herein is a simplification of the three-wire method used with a micrometer to measure the thread pitch of screws and bolts. Existing devices for holding the threadwires include a helical spring on the anvil and spindle of the micrometer and loops to hold the threadwires in place. Another holder uses a rectangular fixture to which the threadwires are permanently attached. This requires a separate holding fixture for each wire size The threadwires are used to measure pitch diameters beyond the range of available thread micrometers. A complete set of threadgage wires may be as many as 18 holders with wires in place.

It is an object of this invention of a new and more useful threadwire holder, to provide a single holder that will accommodate any of the threadwires used for measurement. Further, as an additional object of this invention, in the instance where a screw or bolt is not held stable in place with the usual two wires opposing one wire, with the screw or bolt in between them, additional wires can be put in the holder and they will not fall out. In the instance of a fine pitch screw where the wires are fine, I have provided for a magnet to hold them in place until the micrometer jaws are closed onto the wires and screw combination and the reading taken from the micrometer. In practice, there is a holder on the spindle and a holder on the anvil altho only one is shown in the drawing (FIG. 4) as this invention pertain only to the holder.

The foregoing and other objects of this invention will become more fully apparent from the following detailed description of a preferred embodiment of the invention and from the accompanying drawing, in which:

FIG. 1 is a perspective view of the holder

FIG. 2 is a cross-sectional view of FIG. 1 taken along line 2—2

FIG. 3 is a perspective view of the holder with wires inserted

FIG. 4 is a side elevational view of the holder in use with a micrometer.

In the drawing, FIG. 1 shows the holder as a rectangular flat base 11 being in the range of 1½" to 3" long and ¼" to ½" wide by ⅛" to ⅜" thick; having upright and opposing ends 13 being in the range of ¼" to ⅝" above the flat 11 and having an oval hole 14 suitable to adhesively hold screwthread wires generally varying in OD from wire size 0.150 mm to 3.200 mm. Central to the flat 11 is hole 12 which generally has an OD such as to "press-fit" onto micrometer spindles of OD from 0.200" to 0.400" and the holder being composed of a material selected from rubber and the synthetic rubber compounds having resiliency and elasticity common to natural rubber. Also material can be selected from the various urethanes and silicones that are readily available. Such material will yield as it is press-fit onto the spindle and anvil and will adhere to the spindle and anvil in any position. FIG. 2 shows a section thru line 2—2 of FIG. 1 with the central hole 12 and the oval hole in each end 14 thru which the screwthread wires are inserted and adhesively held by the resiliency of the rubber or rubber-like compound of which the holder is made. FIG. 3 shows the threadwires 15 installed and resiliently held in position thru oval holes 14. In the instance of very fine threadwires it is possible to use the holder that is suitable for larger threadwires by means of two magnets 16 which are embedded or close to the surface of the top face of the flat base 11. Assembly 10 is shown in FIG. 4 resiliently attached to the spindle 23 and opposing the anvil 22 of the micrometer 21 and composing assembly 20.

By the foregoing means it becomes possible to measure the thread pitch of screws and bolts in a lathe or in a part without the use of either hand to hold the thread wires. The very simplicity of the three wire method with this new holder has been demonstrated.

In the foregoing detailed specification the invention has been described and illustrated. The invention so disclosed is not to be limited to these specific embodiments but to such other forms and modifications as shall occur to those skilled in the art.

I claim:

1. An attachment to a micrometer to facilitate the measuring of screwthreads by the three wire method, comprised of a flat base holder having a rectangular form, and upright portions attached or molded so as to become part of said flat base holder at the hole, threadwires supported in said oval holes, said oval holes suitable in size to hold said threadwires therein in a resilient manner dependent on the tacky and non-slip properties of said natural opposite ends and having in each end upright portion, said holder and upright portions being made from either natural rubber, silicone rubber or urethane rubber an oval rubber, silicone rubber or urethane rubber; a micrometer spindle and anvil, which when opened creates an opened jaw; a hole, central to the length and width of said flat base holder and of such size as to slightly yield when put onto said spindle and anvil, constituting a press-fit and supporting said holder with threadwires, between the jaws of said micrometer.

2. The holder of claim 1 in which there are magnets embedded into said flat base and close to the top surface, being on opposite sides of the central hole.

* * * * *